(12) United States Patent
Hida

(10) Patent No.: US 8,896,149 B2
(45) Date of Patent: Nov. 25, 2014

(54) ELECTRIC POWER CONVERTING SYSTEM

(75) Inventor: Tetsuo Hida, Suzuka (JP)

(73) Assignee: Fuji Electirc Co., Ltd., Kawasaki-shi (JP)

( * ) Notice: Subject to any disclaimer, the term of this patent is extended or adjusted under 35 U.S.C. 154(b) by 581 days.

(21) Appl. No.: 13/064,196

(22) Filed: Mar. 10, 2011

(65) Prior Publication Data

US 2011/0248564 A1    Oct. 13, 2011

(30) Foreign Application Priority Data

Mar. 17, 2010    (JP) .................................. 2010-061028

(51) Int. Cl.
    *H02J 3/14*    (2006.01)
(52) U.S. Cl.
    USPC ............................................ 307/31; 307/116
(58) Field of Classification Search
    None
    See application file for complete search history.

(56) References Cited

U.S. PATENT DOCUMENTS

| | | | |
|---|---|---|---|
| 4,598,263 A * | 7/1986 | Heyne et al. .................... | 335/14 |
| 5,170,105 A | 12/1992 | Kumar | |
| 5,619,107 A | 4/1997 | Shinohara et al. | |
| 6,431,297 B1 | 8/2002 | Nakazawa | |
| 2008/0129231 A1 | 6/2008 | Toda et al. | |
| 2010/0277218 A1* | 11/2010 | Schill ............................. | 327/427 |
| 2010/0318248 A1* | 12/2010 | Higuchi et al. .................. | 701/22 |

FOREIGN PATENT DOCUMENTS

| | | |
|---|---|---|
| CN | 101100173 A | 1/2008 |
| EP | 1029732 A2 | 8/2000 |
| JP | H06-113401 A | 4/1994 |
| JP | H08-275570 A | 10/1996 |
| JP | H11-178351 A | 7/1999 |
| JP | 2007-181331 | 7/2007 |
| JP | 2007181331 A * | 7/2007 |
| JP | 2008-017586 A | 1/2008 |

OTHER PUBLICATIONS

Japan Patent Office, "Office Action for JP 2010-061028," Jan. 21, 2014.
China Patent Office, "Office Action for CN 201110068385.1," Jun. 5, 2014.
Europe Patent Office, "Search Report for EP 11158460.3," Sep. 4, 2014.

* cited by examiner

*Primary Examiner* — Rexford Barnie
*Assistant Examiner* — David Shiao
(74) *Attorney, Agent, or Firm* — Manabu Kanesaka

(57) ABSTRACT

An electric power converting system includes a common DC power supply, and a plurality of inverter sets operated mutually independently to one another, and supplied with electric power from the common DC power supply. Each inverter set has an inverter circuit and a main circuit capacitor. The system further includes a plurality of first and second switching circuits. Each first switching circuit is provided between the common DC power supply and each inverter set, and each second switching circuit is provided in each inverter set for discharging charges in the main circuit capacitor.

2 Claims, 4 Drawing Sheets

US 8,896,149 B2

ELECTRIC POWER CONVERTING SYSTEM

FIELD OF THE INVENTION

The present invention relates to an electric converting system formed by a plurality of sets of inverters to which electric power is supplied from a common DC electric power supply and which can be operated mutually independently.

BACKGROUND ART

FIG. 4 is a diagram showing a circuit configuration of an example of a related electric power converting system of this kind (see JP-A-2007-181331, for example).

In the diagram, reference numeral 1 denotes an AC power supply such as a commercial power supply and reference numerals 2 to 5 denote AC motors as loads, to which electric power is supplied respectively from an electric power converting system 10.

The electric power converting system 10 shown in FIG. 4 is formed of an operation sequence circuit 11 conducting the whole operation sequences of the electric power converting system 10, a master disconnecting switch 12, an electromagnetic contactor 13, a converter 14 with diodes in bridge connection, a DC reactor 15 for smoothing the output voltage of the converter 14 and inverter units 20, 30, 40 and 50 as a plurality of sets of inverters.

The inverter units 20, 30, 40 and 50 are formed of capacitors 23, 33, 43 and 53, charging current suppressing resistors 21, 31, 41 and 51, electromagnetic contactors 22, 32, 42 and 52 and inverter circuits 24, 34, 44 and 54, respectively.

Each of the capacitors 23, 33, 43 and 53 is made of a capacitor such as an electrolytic capacitor for smoothing the output voltage of the converter 14; the charging current suppressing resistors 21, 31, 41 and 51 suppress inrush currents to the capacitors 23, 33, 43 and 53.; respectively; the electromagnetic contactors 22, 32, 42 and 52 are connected in parallel to the charging current suppressing resistor 21, 32, 41 and 51, respectively; and each of the inverter circuits 24, 34, 44 and 54 outputs an AC voltage with a desired amplitude and frequency with inverse-parallel connection circuits, in which an IGBT (Insulated Gate Bipolar Transistor) and a diode are connected in inverse-parallel, arranged in bridge connection.

The AC motors 2 to 5 to which electric power is supplied by the electric power converting system 10 shown in FIG. 4 are made available for power sources such as driving sources for conveying line equipment in iron-manufacturing machinery or paper-manufacturing machinery.

In an electric power converting system such as the electric power converting system 10 shown in FIG. 4 formed with a plurality of sets of inverters whose electric power is supplied from a common DC electric power supply and which can be operated mutually independently, as is disclosed in JP-A-2007-181331, for example, various kinds of measures are taken against the case when any one of a plurality of the sets of inverters causes failure so that no malfunction due to the failure affects other inverters.

Moreover, when anyone of a plurality of the sets of inverters causes a failure to be brought into a state in which the operation of the failed inverter is stooped, it is required that the failed inverter can be immediately replaced by an inverter that can be normally operated.

In spite of such a requirement, however, in the related electric power converting system 10 shown in FIG. 4, when any one of the inverter units 20, 30, 40 and 50 causes a failure to be brought into a state in which the operation of the failed inverter unit is stopped, the failed inverter unit is replaced by an inverter that can be normally operated with replacement operations carried out as follows with the operation of the whole electric power converting system 10 being stopped. First, by the instruction from the operation sequence circuit 11, the electromagnetic contactor 13 is opened and, along with this, the operation of the whole electric power converting system 10 is stopped. Thereafter, with the master disconnecting switch 12 being opened, the failed inverter unit is disconnected before a normal inverter unit is connected.

Thus, the related electric power converting system 10 has a problem in that the operation of the whole electric power converting system must be stopped. In particular, in the case in which the subject machinery is a line control system in iron-manufacturing or in paper-manufacturing, this causes tremendous losses. Furthermore, in such an inverter replacement operation, there was also a problem in that the replacement operation requires a certain time because it is necessary to wait for a time to elapse until charges remaining in the respective capacitors forming inverter units are sufficiently discharged.

Accordingly, it is an object of the present invention to provide an electric power converting system in which the above explained problems are solved.

Further objects and advantages of the invention will be apparent from the following description of the invention.

SUMMARY OF THE INVENTION

A first aspect of the invention is directed to an electric power converting system formed by a plurality of sets of inverters capable of being operated mutually independently with electric power thereof supplied from a common DC power supply, wherein the system includes a plurality of sets of first switching circuits provided between the common DC power supply and a plurality of the sets of the inverters as their respective switching circuits, and a plurality of sets of second switching circuits provided for a plurality of the sets of the inverters as their respective switching circuits for discharging main circuit capacitors respectively forming a plurality of the sets of the inverters.

A second aspect of the invention is directed to the electric power converting system according to the first aspect, wherein when at least one of a plurality of the sets of the inverters is disconnected by the operation of its own first switching circuit from the common DC power supply, the second switching circuit, provided for the inverter to be disconnected as its own switching circuit, is operated.

A third aspect of invention is directed to the electric power converting system according to the first aspect or the second aspect, wherein the main circuit capacitors respectively forming a plurality of the sets of the inverters have their respective charging current suppressing resistors connected thereto and the second switching circuits are operated so as to discharge their respective main circuit capacitors through their respective charging current suppressing resistors.

According to the inventions, in an electric power converting system of this kind, when any one of a plurality of the sets of inverters causes a failure, the failed inverter can be safely and immediately replaced by an inverter that can be normally operated without stopping the operation of the whole electric power converting system.

DETAILED DESCRIPTION OF PREFERRED EMBODIMENT

Figure 1:
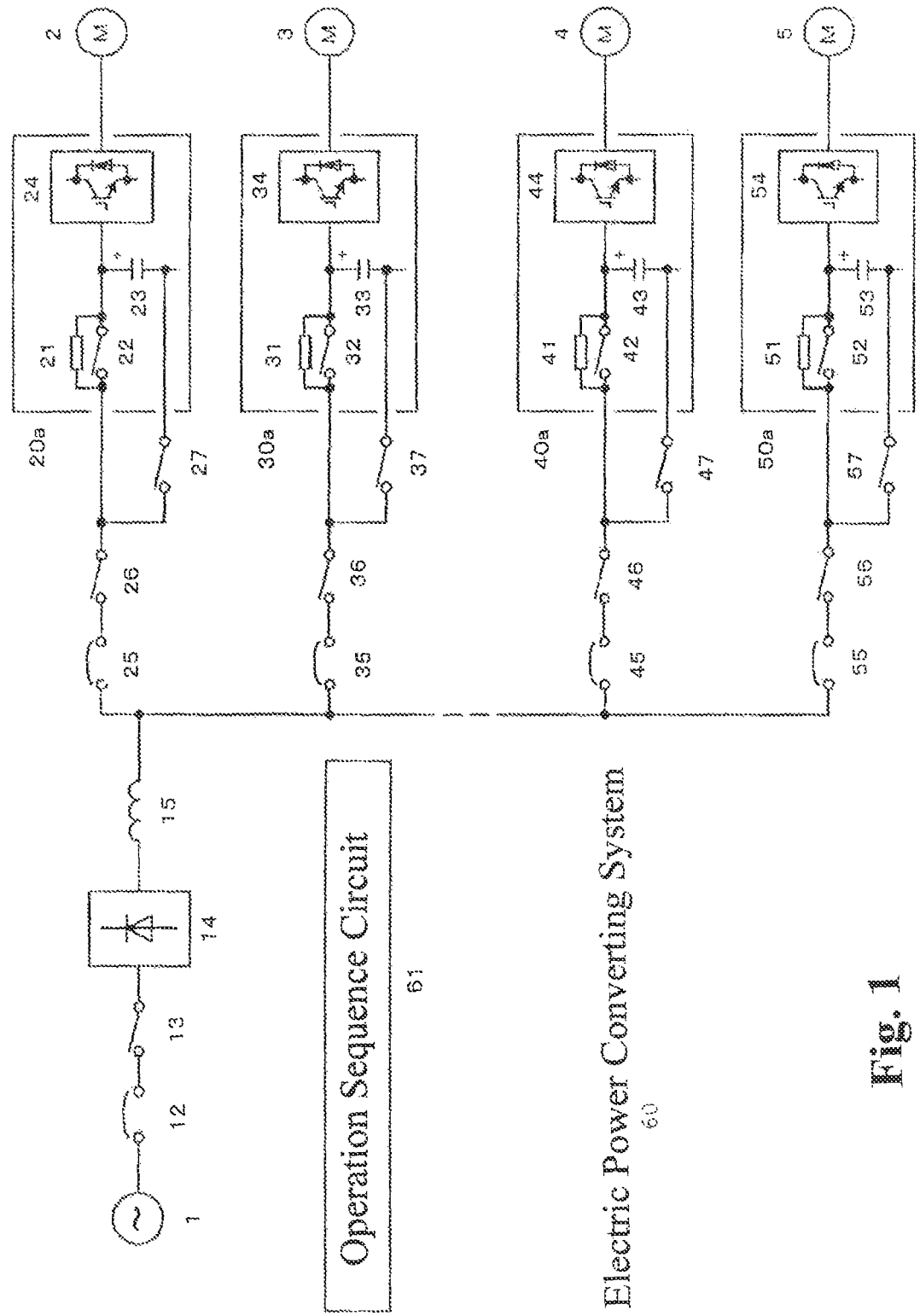
FIG. 1 is a diagram showing the circuit configuration of an example of an electric power converting system according to the invention.
Figure 4:
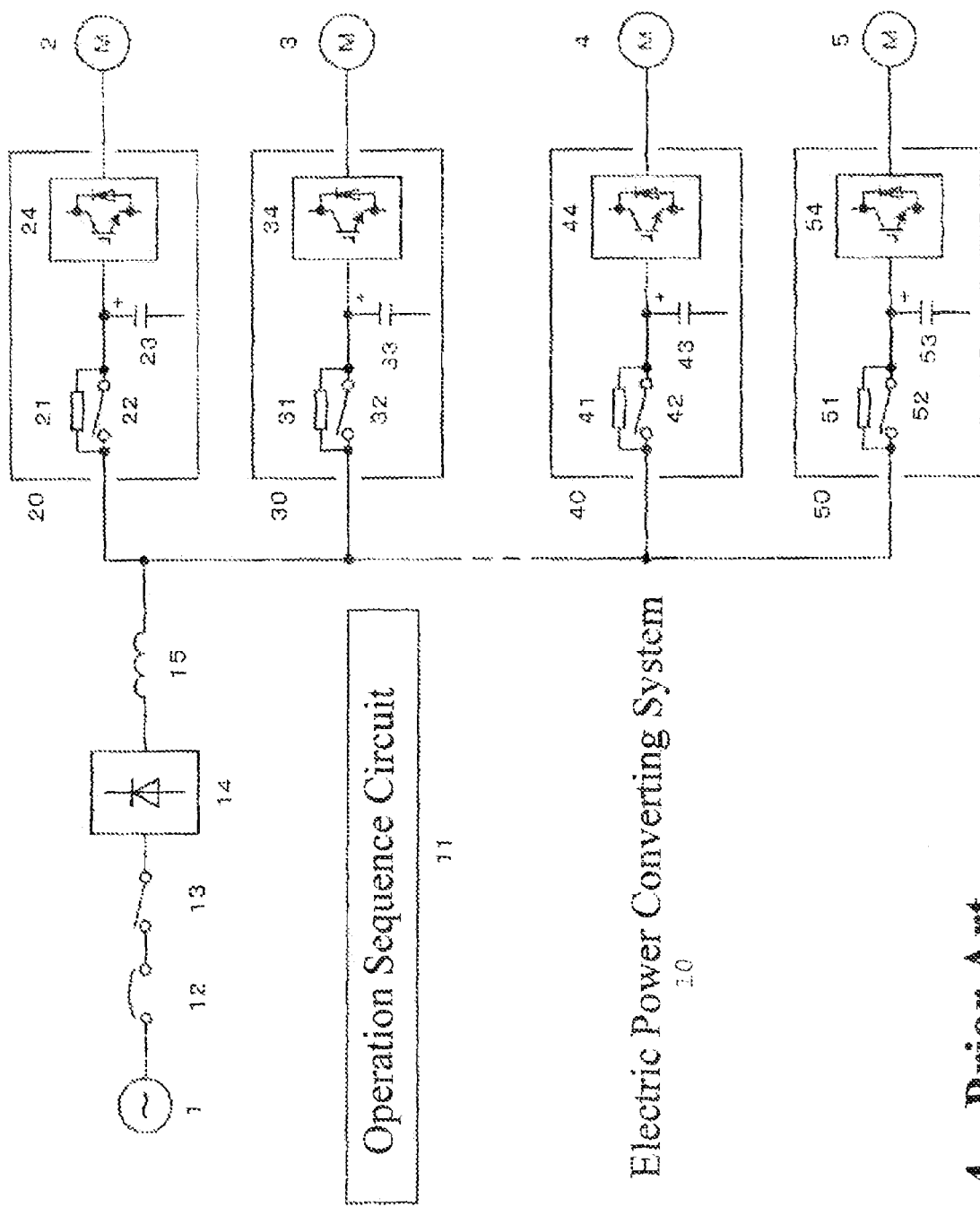
FIG. 4 is a diagram showing a circuit configuration of an example of a related electric power converting system.

FIG. 1 is a diagram showing the circuit configuration of an example of an electric power converting system according to the invention. In the diagram, constituents having the same functions as those in the circuit configuration of the related electric power converting system shown in FIG. 4 are denoted with the same reference numerals and signs.

Namely, in an electric power converting system 60 shown in FIG. 1, instead of the operation sequence circuit 11 in the related electric power converting system 10, an operation sequence circuit 61 is provided. Moreover, disconnecting switches 25, 35, 45 and 55, electromagnetic contactors 26, 36, 46 and 56 and electromagnetic contactors 27, 37, 47 and 57 are additionally provided. The disconnecting switches 25, 35, 45 and 55 form the first switching circuits together with the electromagnetic contactors 26, 36, 46 and 56, respectively. The electromagnetic contactors 27, 37, 47 and 57 form the second switching circuits together with charging current suppressing resistors 21, 31, 41 and 51 provided in inverter units 20a, 30a, 40a and 50a, respectively. In addition, the inverter units 20a, 30a, 40a and 50a have capacitors 23, 33, 43 and 53, respectively, provided with terminals on their respective negative potential sides. To each of the negative potential side terminals, a connecting wire is connected, and each of the other end is externally pulled out to be connected to each of the electromagnetic contactors 27, 37, 47 and 57.

In the electric power converting system 60 according to the invention shown in FIG. 1, in a normal operation, all of a master disconnecting switch 12, an electromagnetic contactor 13, the disconnecting switches 25, 35, 45 and 55, the electromagnetic contactors 26, 36, 46 and 56 and electromagnetic contactors 22, 32, 42 and 52 are brought into closed states.

However, when the capacitors 23, 33, 43 and 53 in the inverter units 20a, 30a, 40a and 50a, respectively, are not charged in the case such as immediately after turning on the power, large inrush currents may flow in the respective inverter units 20a, 30a, 40a and 50a. Therefore, for avoiding this, the inverter units 20a, 30a, 40a and 50a are started as follows. First, with the electromagnetic contactors 22, 32, 42 and 52 brought into opened states, the capacitors 23, 33, 43 and 53 are charged through charging current suppressing resistors 21, 31, 41 and 51, respectively, to thereby suppress respective inrush currents to flow. Thereafter, with voltages across the capacitors 23, 33, 43 and 53 exceeding the minimum permissible input voltage $V_H$, the electromagnetic contactors 22, 32, 42 and 52 are closed, by which the charging current suppressing resistors 21, 31, 41 and 51 are short-circuited for making the electric power converting system 60 carry out a normal operation.

Suppose that in the electric power converting system 60 in a normal operation, the inverter unit 20a, for example, of the inverter units 20a, 30a, 40a and 50a in operation causes failure to bring the operation of the inverter unit 20a into a state of being stopped. With respect to the operation at this time for replacing the failed inverter unit 20a by an inverter unit capable of carrying out a normal operation will be explained in the following with reference to flow charts shown in FIG. 2 and FIG. 3.

Figure 2:
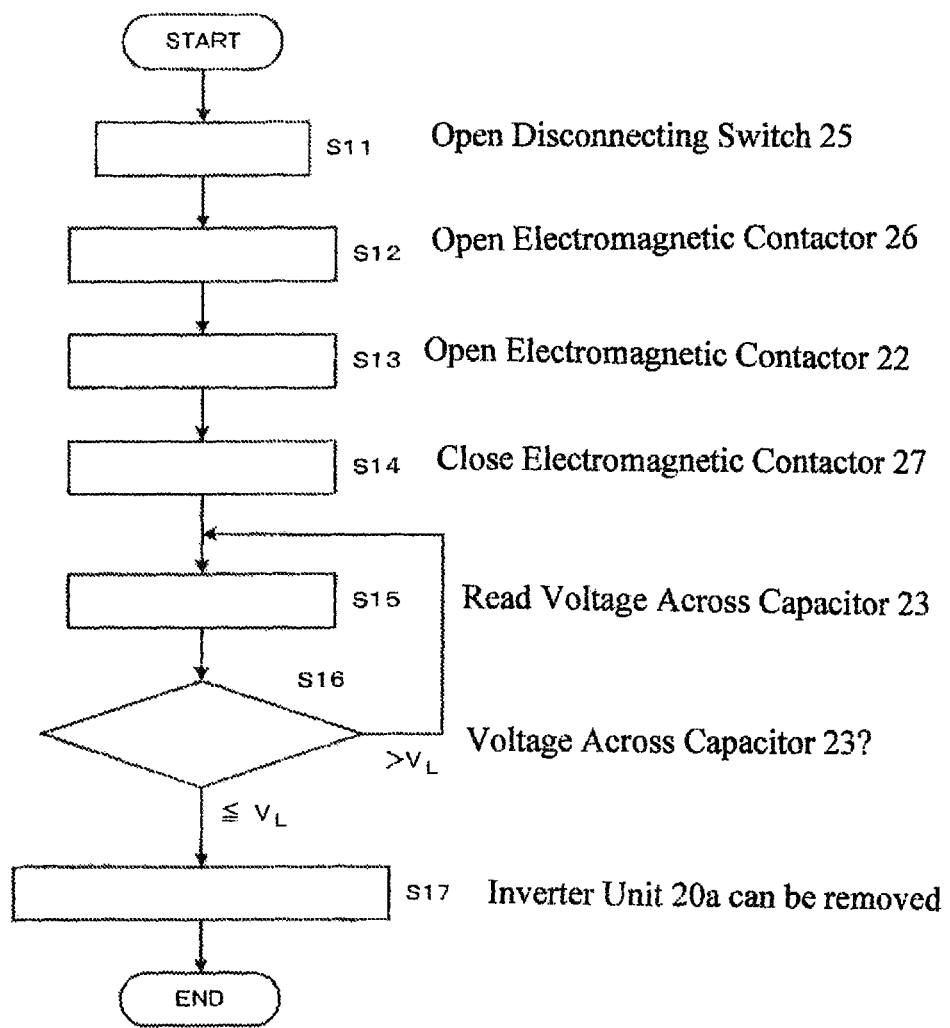
FIG. 2 is a flowchart illustrating the steps of a preliminary operation in removing a failed inverter unit in the electric power converting system shown in FIG. 1.

FIG. 2 is a flowchart illustrating the steps of a preliminary operation in removing the failed inverter unit 20a in the electric power converting system 60 shown in FIG. 1.

Namely, in FIG. 2, in the electric power converting system 60 operated by the normal inverter units 30a, 40a and 50a, the disconnecting switch 25, normally in a closed state, is opened (step S11) to bring the electric power converting system 60 into a state in which no output voltage of the converter 14 is applied to the inverter unit 20a.

Next, by an instruction from the operation sequence circuit 61, the electromagnetic contactor 26 is brought into an open state (step S12) and, along with this, the electromagnetic contactors 22 is brought into an open state (step S13).

Following this, by an instruction from the operation sequence circuit 61, the electromagnetic contactor 27, normally in an open state, is closed (step S14), by which the second switching circuit (discharging circuit of the capacitor 23) is formed with the path of the positive potential side of the capacitor 23→the charging current suppressing resistor 21→the contact point of the electromagnetic contactor 27→the negative potential side of the capacitor 23.

Subsequent to this, by an instruction from the operation sequence circuit 61, a voltage across the capacitor 23 is measured when the charges remained in the capacitor 23 are being gradually discharged through the above explained path (step S15). Through the measurement, monitoring is carried out as to whether or not the voltage across the capacitor 23 is lowered to be equal to or less than the voltage $V_L$ previously set as the voltage at which the replacement operation can be safely carried out (step S16). When the monitored voltage exceeds the voltage $V_L$, the operation returns to step S15. Moreover, when the monitored voltage is equal to or less than the voltage $V_L$, it is decided that the voltage across the capacitor 23 is sufficiently lowered and the operation is shifted to step S17 to inform externally that the inverter unit 20a is in a removable state.

With the steps illustrated by the flow chart explained above, the failed inverter unit 20a can be safely removed without stopping the electric power converting system 60 in operation by the normal inverter units 30a, 40a and 50a. At this time, by forcing the charges in the capacitor 23 to discharge with the use of the charging current suppressing resistor 21 which is normally provided in the inverter unit 20a, a discharging time is shortened to make it possible to shorten the time required for the work of replacing the failed inverter unit 20a with a normal one.

In addition, the functions in step S15 and step S16 shown in FIG. 2 can be replaced by the operation of a timer in which a time, elapsing from the instant when the electromagnetic contactor 27 is closed in step S14 to the instant when the voltage across the capacitor 23 lowers to be equal to or less than the voltage $V_L$, is set as a specified standby time. In this case, mounting of a relatively expensive DC voltage detector can be omitted.

Figure 3:
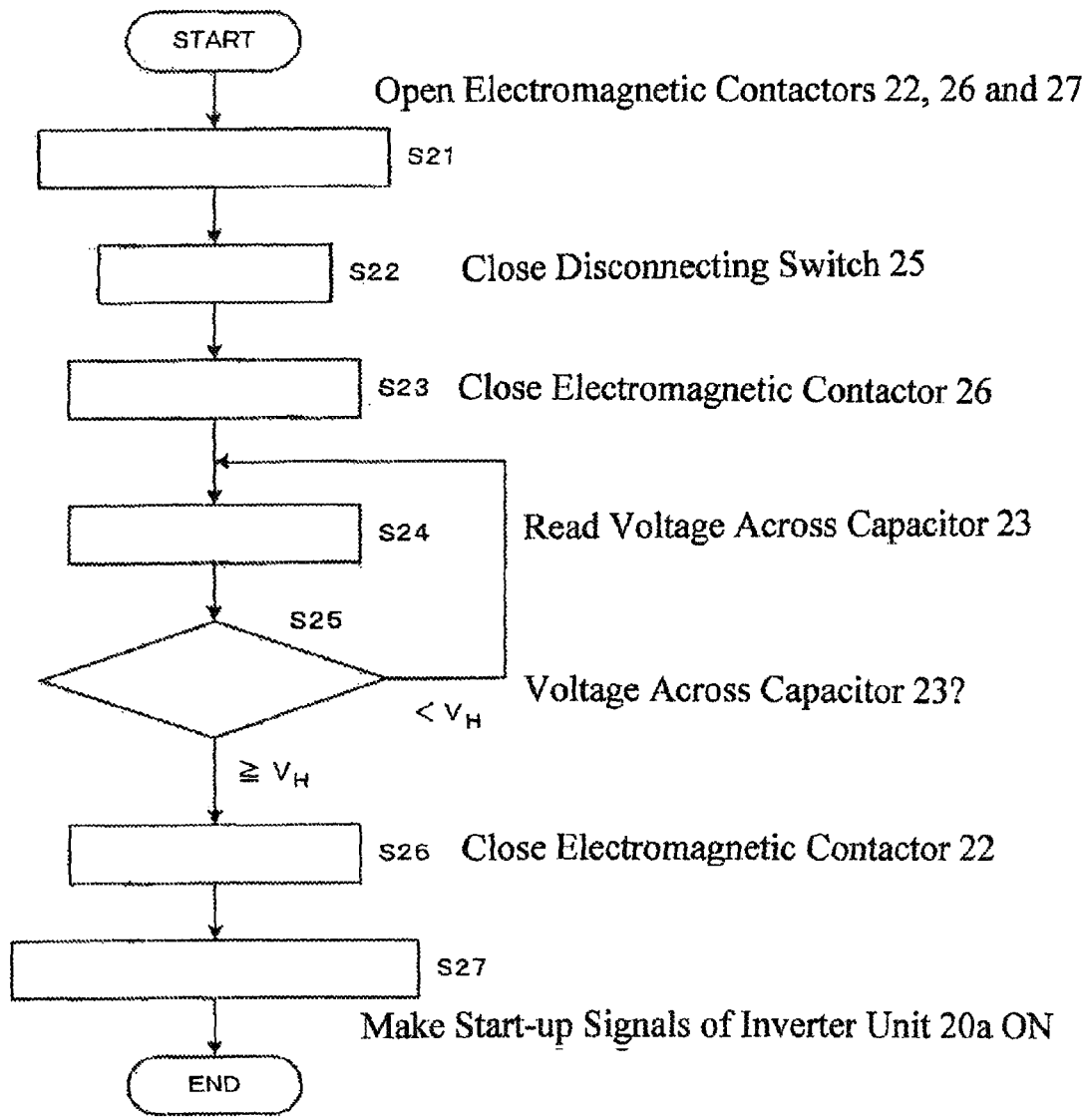
FIG. 3 is a flowchart illustrating the steps of a preliminary operation in mounting an inverter unit after the removal of the failed inverter unit and starting the inverter unit in the electric power converting system shown in FIG. 1.

FIG. 3 is a flowchart illustrating the steps of a preliminary operation in mounting a new inverter unit after the removal of the failed inverter unit 20a and making the inverter unit start an operation in the electric power converting system 60 shown in FIG. 1.

Namely, in FIG. 3, after the new inverter unit 20a carrying out a normal operation is mounted, the electromagnetic contactors 22, 26 and 27 are made opened (step S21) by an instruction from the operation sequence circuit 61, by which the electric power converting system 60 is brought into a state in which no output voltage of the converter 14 is suddenly applied to the inverter unit 20*a*.

Next, with the disconnecting switch 25 brought into a closed state (step S22), the electromagnetic contactor 26 is closed by an instruction from the operation sequence circuit 61 (step S23), by which an output voltage of the converter 14 is applied to the capacitor 23 through the charging current suppressing resistor 21.

Then, by an instruction from the operation sequence circuit 61, the voltage across the capacitor 23 is measured (step S24) when the capacitor 23 is gradually charged by the above voltage application operation for monitoring as to whether or not the measured voltage across the capacitor 23 becomes equal to or more than the previously set minimum permissible input voltage $V_H$ (step S25). When the monitored voltage is less than the voltage $V_H$, the operation returns to step S24. Moreover, when the monitored voltage is equal to or more than the voltage $V_H$, it is decided that the voltage across the capacitor 23 is sufficiently increased and the operation is shifted to step S26 to close the electromagnetic contactor 22, by which the charging current suppressing resistor 21 is short-circuited to bring the inverter unit 20*a* into a state in which a normal DC voltage is applied thereto.

Next to this, by an instruction from the operation sequence circuit 61, a start-up signal is given to the inverter circuit 24 forming the inverter unit 20*a* (step S27), by which the electric power converting system 60 is restored to its normal operating condition.

In addition, the functions in step S24 and step S25 shown in FIG. 3 can be replaced by the operation of a timer in which a time, elapsing from the instant when the electromagnetic contactor 26 is closed in step S23 to the instant when the voltage across the capacitor 23 increases to be equal to or more than the voltage $V_H$, is set as a specified standby time. In this case, mounting of a relatively expensive DC voltage detector can be omitted.

While the present invention has been particularly shown and described with reference to the preferred embodiment thereof, it will be understood by those skilled in the art that the foregoing and other changes in form and details can be made therein without departing from the spirit and scope of the present invention.

The disclosure of Japanese Patent Application No. 2010-061028 filed on Mar. 17, 2010 is incorporated herein as a reference.

What is claimed is:

1. An electric power converting system, comprising:
   a common DC power supply,
   a plurality of inverter sets operated mutually independently to one another, and supplied with electric power from the common DC power supply, each inverter set having an inverter circuit,
   main circuit capacitors, each being connected to each inverter set,
   a plurality of first switching circuits, each being provided between the common DC power supply and each inverter set and having a disconnecting switch and a first electromagnetic contactor connected in series with the disconnecting switch being at a side of the common DC power supply,
   a plurality of second switching circuits, each being provided between each first switching circuit and each inverter circuit for discharging charges in the main circuit capacitor and having a charging current suppressing resistor and a second electromagnetic contactor arranged parallel to each other,
   a plurality of third electromagnetic contactors, each being connected at one end to the main circuit capacitor and at another end between the first electromagnetic contactor and each second switching circuit, and
   an operation sequence circuit sequentially operating the first and second switching circuits, and the third electromagnetic contactors such that when one of the plurality of inverter sets is to be disconnected from the common DC power supply, the disconnecting switch corresponding to the inverter set to be disconnected is disconnected, then the first electromagnetic contactor is opened, then the second electromagnetic contactor is opened, and then the third electromagnetic contactor is closed so as to discharge a charge in the main circuit capacitor through the charging current suppressing resistor corresponding thereto, said operation sequence circuit further controlling to monitor whether or not a voltage across the main circuit capacitor is lower than a predetermined voltage, and to inform that when the voltage across the main circuit capacitor is lower than the predetermined voltage, said one of the plurality of inverter sets is in a removable state.

2. The electric power converting system as claimed in claim 1, wherein when the second electromagnetic contactor which is generally closed is opened and the third electromagnetic contactor which is generally opened is closed, a discharging circuit of the capacitor passing through a positive side of the main circuit capacitor, the charging current suppressing resistor, the third electromagnetic contactor and a negative potential side of the main circuit capacitor is formed.

* * * * *

UNITED STATES PATENT AND TRADEMARK OFFICE
CERTIFICATE OF CORRECTION

PATENT NO. : 8,896,149 B2  
APPLICATION NO. : 13/064196  
DATED : November 25, 2014  
INVENTOR(S) : Tetsuo Hida It is certified that error appears in the above-identified patent and that said Letters Patent is hereby corrected as shown below:

In the Specification

Please change column 1, line 60, "the failed inverter is stooped" to --"the failed inverter is stopped--.

Signed and Sealed this  
Ninth Day of June, 2015

Michelle K. Lee  
*Director of the United States Patent and Trademark Office*